June 17, 1947. J. P. SMITH 2,422,442
SLUICE BOX WITH WATER DISTRIBUTION PIPES
Filed May 18, 1945 2 Sheets-Sheet 2
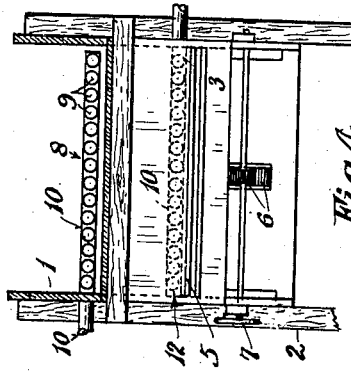
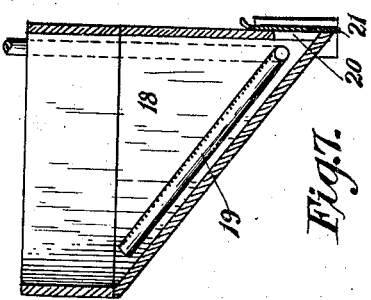
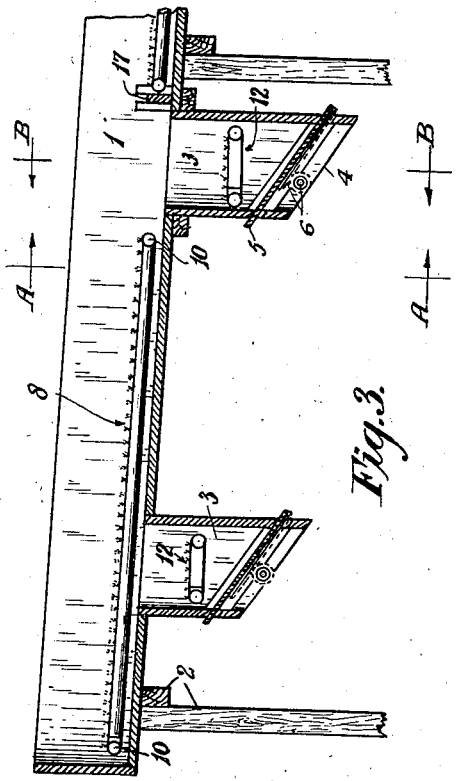
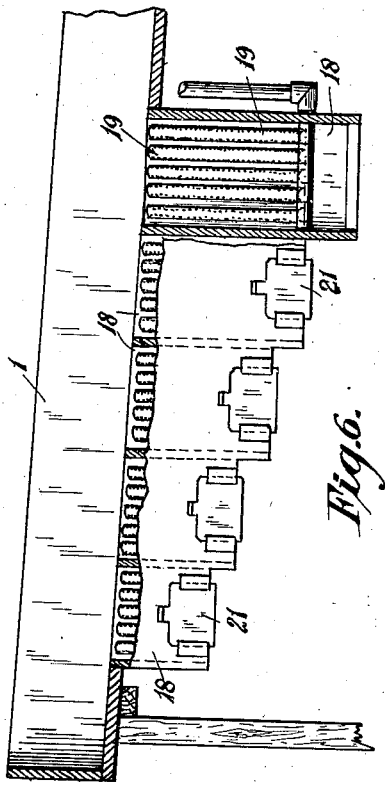
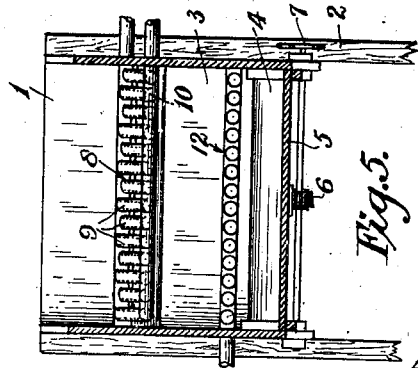
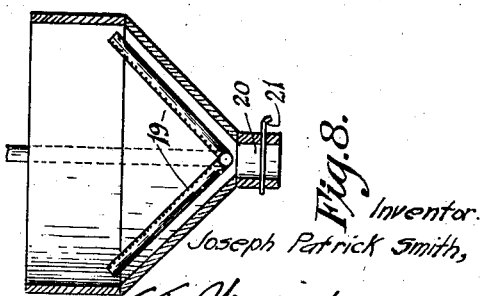
Inventor.
Joseph Patrick Smith,
By E. F. Hindroth Attorney Patented June 17, 1947

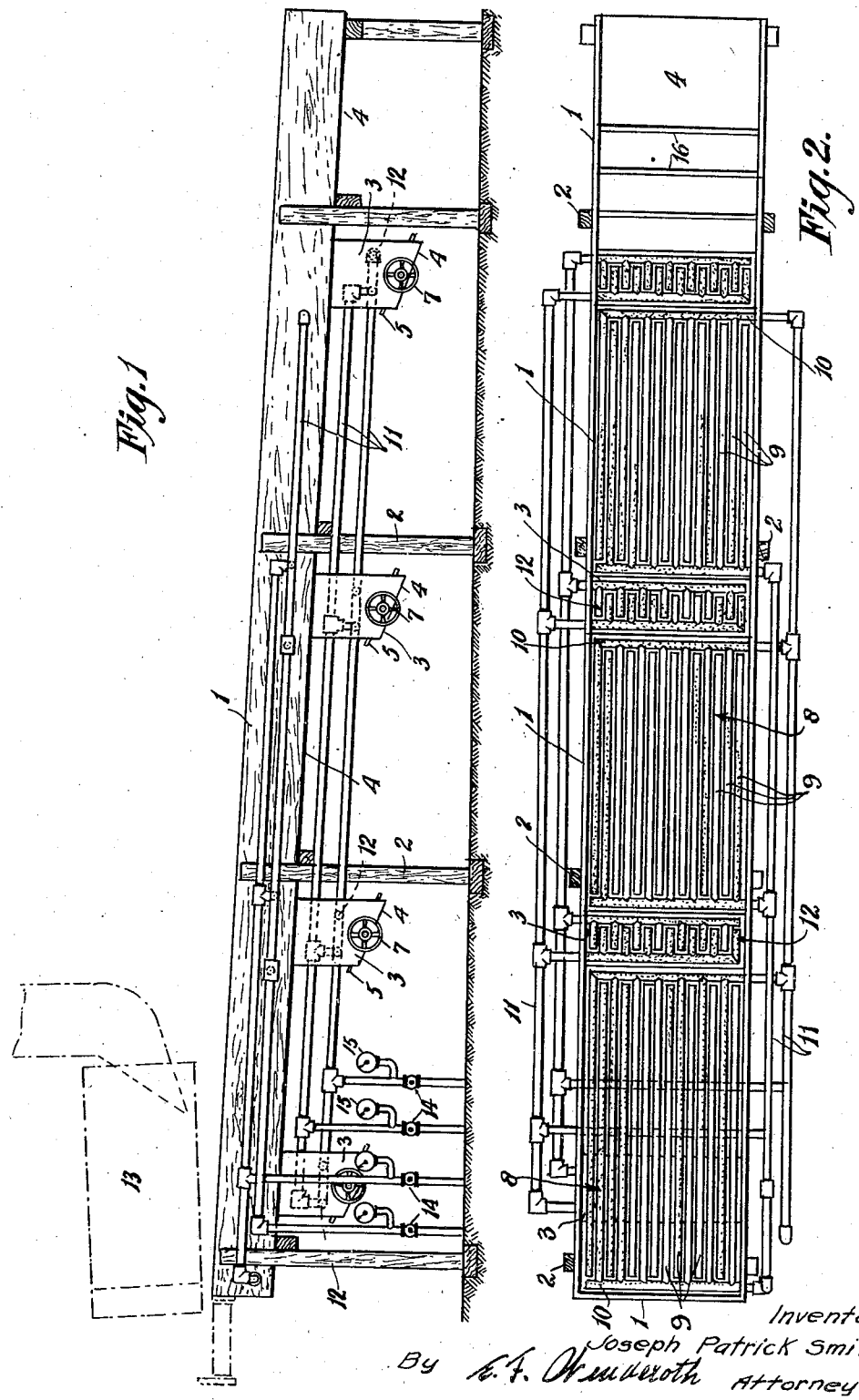

2,422,442

UNITED STATES PATENT OFFICE 2,422,442

SLUICE BOX WITH WATER DISTRIBUTION PIPES

Joseph P. Smith, Pyrmont, New South Wales, Australia

Application May 18, 1945, Serial No. 594,456 In Australia June 15, 1944

5 Claims. (Cl. 209—458)

This invention relates to sluice boxes or the like for use in the recovery of valuable minerals from alluvials, battery crushings or the like.

In the recovery of minerals such as gold from alluvials, battery crushings and the like, by wet sluicing methods using sluice boxes and a constant supply of running water, the use of shovels or similar hand tools is commonly resorted to in order to maintain the material to be treated, in a state of agitation, so that the mineral content may be allowed to settle on the floor or bottom of the sluice box, or collected in riffles formed transversely in or on the bottom of said sluice box.

It has been found in practice, supported by observation, that with sluice boxes of the type at present in use, a portion of the valuable mineral is lost, more particularly when the mineral is of a flaky or greasy nature, or when the material being treated is insufficiently agitated.

As most alluvials and battery crushings or like materials contain a large proportion of slime and cement, it is essential that such material should be maintained in a thoroughly agitated state during treatment; otherwise the action of running water is liable to cause the slime or cement particles to become set or compacted on the bottom of the sluice box, and at the same time clog the riffles, thus causing a smooth surface to be formed on the slime or cement which prevents the mineral from being deposited on to the floor of the sluice box or collected in the riffles.

The main object of this invention is to provide a sluice box or the like of simple construction having means whereby the material being treated, with the aid of running water, can be maintained in a constant and even state of agitation without the aid of hand or mechanically operated tools or appliances.

Another object of the invention is to provide in a sluice box or the like, means whereby a constant supply of clean water can be introduced, under pressure, into the sluice box near the bottom, in an upward direction, so that said water will rise through the materials, to agitate the same, and allow the mineral particles to gravitate on to the bottom of the sluice box and into the riffles for subsequent recovery.

A further object of the invention is to provide means whereby air, under pressure, together with, or without, a constant supply of running water, can be passed upwardly through the material to maintain the same in a state of agitation, and means whereby the pressure of air and/or water, can be regulated to suit special requirements.

A still further object of the invention is to provide in a sluice box one or more sumps whereby the mineral concentrates or the like after passing down the sluice box can be collected, and means whereby the materials being deposited in said sump or sumps will be thoroughly agitated.

The invention will now be more fully described, aided by a reference to the accompanying sheets of drawings, wherein:

Fig. 1 is a view in side elevation, and

Fig. 2 a view in plan, of a sluice box constructed according to this invention, and adapted for the recovery of minerals from alluvials;

Fig. 3 is a sectional elevation of the top end portion of the sluice box seen in Figs. 1 and 2, illustrating the arrangement of the perforated pipe grills;

Fig. 4 is a cross section taken on lines A—A of Fig. 3;

Fig. 5 is a cross section taken on lines B—B also of Fig. 3;

Fig. 6 is a diagrammatic view in section showing a sluice box adapted for treating battery crushings such as sand, tailings or the like;

Fig. 7 is a cross section of the sump seen in Fig. 6; and

Fig. 8 is a modified form of sump adapted to receive the material from the floor of the sluice box seen in Fig. 6.

A sluice box for treating alluvials or the like is shown in Figs. 1 to 5 of the drawings, and it comprises a rectangular shaped structure 1 of any approved dimensions constructed from wood and mounted on suitable frame-work 2.

The sluice box is shown having rectangular shaped sumps 3 which are arranged at a predetermined distance apart, according to the total length of the sluice box.

The sluice box may be made in one or more launders or sections and each section or launder is furnished with one or more sumps 3, as shown in Figs. 1, 2 and 6 of the drawings.

Each sluice box sump 3 is constructed preferably as shown having a sloping bottom 4 and furnished with a sliding discharge valve or gate 5 which is operated by rack and pinion gear 6 through the medium of a hand wheel 7; but, if desired, any other approved form of discharge valve or the like may be employed to enable the contents of the sump 3 to be discharged as and when required.

As shown in the drawings, the sluice box is arranged at a suitable angle, longitudinally, so that the materials being treated will gravitate or flow downwardly through the sluice box into the sump 3.

Each launder or like portion of the sluice box is fitted with a pipe structure 8 of the grill formation made from a plurality of perforated pipes which are suitably connected together and arranged to lie slightly above but parallel with the bottom of each section or launder portion of the sluice box, as seen in Figs. 3, 4 and 5.

As shown in the drawing, each perforated pipe grill or like structure 8 is built in two sections and each section comprises a series of longitudinally arranged pipes 9, one end of each being closed while the other end of each longitudinal pipe is connected to a transverse pipe 10, which extends through the wall of the sluice box and is connected to the main supply pipe 11.

The longitudinally arranged perforated pipes are spaced at the required distance apart to suit the density or fineness of the materials being treated, while the perforations in said pipes may be of any suitable diameter and pitch as may be found most suitable, so that when air or water (or both) is delivered into said pipes, under pressure, it will be forced in a vertical direction through the perforations for the purpose of agitating the alluvial or like material in the manner hereinafter described.

As shown, each sump 3 of the sluice box 1 is fitted with a perforated pipe grill 12, which is similar in construction to the perforated pipe grills 8 but is arranged in each sump at a predetermined position below the level of the bottom of the sluice box, so as to receive the overflow of materials therefrom.

The material being treated, instead of being delivered direct on to the bottom of the sluice box in the ordinary manner, is delivered directly upon the perforated pipe grill 8 in the upper or first section of the sluice box 1, and in such a manner that the pressure of water and/or air passing upwardly through the perforations in the pipes will cause the materials to be thoroughly agitated and washed to prevent the same banking up or clogging, and, at the same time, allow or cause all the mineral particles to be collected in the sumps 3.

For the purpose, suitable feed mechanism such as a revolving screen 13 of the perforated or woven type, as indicated by the broken lines in Fig. 1 may be employed to automatically deliver the material on to the perforated pipe grill of the first section or launder portion of the sluice box; and said revolving screen is arranged or disposed longitudinally above the feed end of sluice box 1, as shown.

It will be clearly understood that any other or well-known or approved type of mechanically or manually operated mechanism may be provided for effectively delivering and spreading the alluvial or like material on to the perforated pipe grill in the sluice box.

It will be further understood that it is necessary when treating different types of classes of materials that the pressure of air and water passing through the perforated pipes should be regulated, and for this purpose, suitable regulating cocks or valves 14 and pressure gauges 15 are fitted to the main supply pipes 11, as seen in Fig. 1.

According to the invention, as the alluvial or other material is delivered on to the pipe grill or the like in the first section or launder of the sluice box, the pressure of air or water passing through the perforations causes disintegration of the material and allows the same to flow freely downwardly on the bottom proper of the sluice box into the sumps 3.

To enable the overflow of material from one section or launder to be delivered on to the pipe grill 8 of the next section or launder, a baffle board 17, or the like, is fitted in the sluice box as shown in Fig. 3 at the head or feed-in portion of each section.

If desired, suitable riffles or the like 16 for collecting minerals may be formed on the bottom of the sluice box at the discharge end of the same, as shown in Fig. 2.

For treating battery crushings, tailings or like material of a very fine character, the sluice box 1 instead of having a perforated pipe grill fitted therein as seen in Fig. 3, is constructed, as seen in Fig. 6, having its bottom portion comprising a plurality of sumps 18 which are arranged as shown, so that the material will overflow from one sump into another, to provide efficient means for separating and collecting the minerals from the material as it flows through the sluice box.

Each sump 18 may be of any desired dimensions and it is fitted with a perforated pipe grill 19, somewhat of the type seen in Figs. 2 and 3 of the drawing, to discharge air or water into the sump, so as to maintain the contents in a state of agitation and allow the heavy mineral particles to settle into the discharge end portion of the sump.

As shown in Figs. 7 and 8, the pipe grills 19 in the sumps 18 are arranged slightly above and parallel with the sloping bottom of the sump, instead of horizontal as shown in the sumps seen in Figs. 3, 4 and 5.

Each sump 18 may be formed having a sloping bottom, as shown in Figs. 6 and 7, to deliver the material to one side of the sluice box, or, if desired, it may be of V section, as shown in Fig. 8, with the discharge opening 20 at the centre of the sump. Each sump 18 is fitted with a discharge valve or gate 21 of any well known or approved type, or, if desired, suitable pipes and discharge valves may be fitted to the bottom or sides of the sump for the discharge of the material therefrom.

I claim:

1. A sluice box for treating alluvials or the like for recovery of minerals therefrom comprising a rectangular box structure having a plurality of launders, means for introducing material to said structure, means in each launder for forcing a fluid vertically upward through said material, said fluid forcing means forming a perforated grill structure comprising two sections of perforated pipes alternately arranged longitudinally of said launder and disposed a predetermined distance above the bottom of said launder, and means at the discharge end of each launder for collecting the said mineral deposits.

2. A sluice box for treating alluvials or the like for recovery of minerals therefrom comprising a rectangular box-like structure having a plurality of launders, a perforated grill disposed in each launder and elevated from the bottom of said launder, means for introducing material directly to said perforated grill, means for forcing a fluid through said grill in a vertical direction for disintegration and agitation of said material whereby mineral particles in said material will gravitate to said bottom of said launder, and means for collecting said particles at the discharge end of said launders, said collecting means comprising a sump having two sections of alternately arranged longitudinally disposed perforated pipes forming a perforated grill mounted therein and means for forcing a fluid upwardly through said grill in said sump for further agitation and washing of said material.

3. A sluice box for treating alluvials or the like for recovery of minerals therefrom, comprising a rectangular box-like structure having a series of connected launders, mineral collecting means disposed at the discharge end of each of said launders, each of said launders having a perforated grill structure disposed therein and being positioned above and parallel to the bottom of said launder, said grill comprising two sections of alternately arranged longitudinally disposed perforated pipes, means for introducing said material directly on said grill, means for forcing a fluid vertically from said perforated pipes through said material for agitating the same for gravitation of said minerals, said collecting means comprising a sump having two sections of alternately arranged longitudinally disposed perforated pipes forming a perforated grill mounted therein and means for forcing a fluid upwardly through said grill in said sump for further agitation and washing of said material.

4. In a sluice box for treating alluvials or the like for recovery of minerals therefrom as claimed in claim 3, means for regulating the pressure and flow of said fluid through said perforated pipes comprising said grill structures and pressure indicating means.

5. In a sluice box for treating materials such as alluvials, battery crushings or the like, for the recovery of minerals the combination of a plurality of sumps arranged in series forming the bottom portion of said sluice box for collecting said minerals, said sumps having a sloping bottom portion, a perforated grill comprising a plurality of perforated pipes mounted in said sumps parallel to but removed from said sloping bottom portion, means for forcing a fluid through said perforated pipes for agitating and washing said materials and means for controlling the discharge of said material from each sump.

JOSEPH P. SMITH.

REFERENCES CITED

The following references are of record in the file of this patent:

UNITED STATES PATENTS

| Number | Name | Date |
| --- | --- | --- |
| 448,710 | Chick | Mar. 24, 1891 |
| 252,793 | Oliver | Jan. 24, 1882 |
| 1,409,385 | McDougall | Mar. 14, 1922 |
| 847,519 | Sloane | Mar. 19, 1907 |
| 1,170,848 | Richards | Feb. 8, 1916 |
| 299,235 | Loomis | May 27, 1884 |
| 1,600,489 | Schifferle | Sept. 21, 1926 |